United States Patent
Kim et al.

(10) Patent No.: US 11,725,642 B2
(45) Date of Patent: Aug. 15, 2023

(54) LINEAR COMPRESSOR

(71) Applicant: LG Electronics Inc., Seoul (KR)

(72) Inventors: Geonwoo Kim, Seoul (KR); Junghae Kim, Seoul (KR); Jaeyong Jang, Seoul (KR); Donghan Kang, Seoul (KR); Jinwoong Jung, Seoul (KR); Chulgi Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 16/929,546

(22) Filed: Jul. 15, 2020

(65) Prior Publication Data
US 2021/0095653 A1 Apr. 1, 2021

(30) Foreign Application Priority Data
Oct. 1, 2019 (KR) .......................... 10-2019-0121757

(51) Int. Cl.
*F04B 35/04* (2006.01)
*F04B 39/12* (2006.01)
(Continued)

(52) U.S. Cl.
CPC .......... *F04B 35/045* (2013.01); *F04B 39/122* (2013.01); *F04B 39/16* (2013.01);
(Continued)

(58) Field of Classification Search
CPC ...... F04B 35/045; F04B 39/12; F04B 39/122; F04B 39/16; F04B 39/0005; F04B 39/023;
(Continued)

(56) References Cited

U.S. PATENT DOCUMENTS

| 1,757,690 A * | 5/1930 | Strindberg ............. B01D 46/00 126/299 F |
| 5,588,504 A * | 12/1996 | Spiegel ..................... F01M 1/08 184/6.26 |
| 2015/0369225 A1* | 12/2015 | Ha ........................ F04B 39/122 417/443 |

FOREIGN PATENT DOCUMENTS

| CN | 104524896 | 4/2015 |
| CN | 105298799 | 2/2016 |

(Continued)

OTHER PUBLICATIONS

KR20160000322 translation (Year: 2022).*
(Continued)

*Primary Examiner* — Kenneth J Hansen
*Assistant Examiner* — David N Brandt
(74) *Attorney, Agent, or Firm* — Fish & Richardson P.C.

(57) ABSTRACT

A linear compressor includes a compressor body configured to compress a refrigerant. The compressor body includes a cylinder, a discharge valve, a groove, a gas hole, and a flow restrictor. The cylinder receives a piston. The discharge valve is configured to open and close one side of the cylinder and define a compression space for the refrigerant together with the piston. The groove is defined in an outer circumferential surface of the cylinder and into which at least a portion of the refrigerant discharged through the discharge valve is introduced. The gas hole is defined in the groove to pass through the cylinder. The flow restrictor includes twisting wires made of different materials and is disposed to be wound around the groove.

20 Claims, 9 Drawing Sheets

(51) Int. Cl.
*F04B 39/16* (2006.01)
*F04B 39/02* (2006.01)
*F04B 53/20* (2006.01)
*B01D 46/00* (2022.01)

(52) U.S. Cl.
CPC ...... *B01D 46/0005* (2013.01); *B01D 46/0012* (2013.01); *B01D 46/0047* (2013.01); *B01D 2279/35* (2013.01); *F04B 39/023* (2013.01); *F04B 39/0292* (2013.01); *F04B 53/20* (2013.01); *F05B 2210/14* (2013.01); *F05B 2260/98* (2013.01)

(58) Field of Classification Search
CPC .. F04B 39/0292; F04B 53/20; F04B 39/0238; F04B 53/18; F05B 2210/14; F05B 2260/98; B01D 46/00; B01D 46/0002; B01D 46/0005; B01D 46/0012; B01D 46/0039; B01D 46/0047; B01D 2279/35
See application file for complete search history.

(56) References Cited

FOREIGN PATENT DOCUMENTS

| | | | | |
|---|---|---|---|---|
| CN | 105298801 | 2/2016 | | |
| CN | 107339207 | 11/2017 | | |
| EP | 2960506 | 12/2015 | | |
| EP | 3239521 | 11/2017 | | |
| KR | 1020090044884 | 5/2009 | | |
| KR | 20160000322 | 1/2016 | | |
| KR | 20160000322 | * 4/2016 | ............ | F04B 35/045 |
| KR | 20170123042 | 11/2017 | | |
| KR | 20170124903 | 11/2017 | | |
| KR | 20180079866 | 7/2018 | | |
| KR | 20160001056 | 1/2021 | | |

OTHER PUBLICATIONS

Can you heat PET plastic pdf from vocepergunta.com/library/artigo/read/6586-can-you-heat-pet-plastic (Year: 2022).*
The Properties and Advantages of Polytetrafluoroethylene (PTFE) AFT Fluorotec pdf from fluorotec.com/news/blog/the-properties-and-advantages-of-polytetrafluoroethylene-ptfe/) (Year: 2016).*
Korean Notice of Allowance in Korean Appln. No. 10-2019-0121757, dated Jul. 17, 2020, 5 pages (with English translation).
EP Extended European Search Report in European Appln. No. 20188989.6, dated Nov. 10, 2020, 4 pages.
Office Action in Chinese Appln. No. 202010693285. 7, dated Apr. 2, 2022, 11 pages (with English translation).

* cited by examiner

LINEAR COMPRESSOR

CROSS-REFERENCE TO RELATED APPLICATION

This application is based on and claims the benefit of priority to Korean Patent Application No. 10-2019-0121757, filed on Oct. 1, 2019, in the Korean Intellectual Property Office, the disclosure of which is incorporated herein in its entirety by reference.

TECHNICAL FIELD

The present disclosure relates to a linear compressor that is utilized for various electronic devices.

BACKGROUND

A heat pump system circulates a refrigerant to transfer heat from a specific place to another place. The heat pump system can repeatedly perform compression, condensation, expansion, and evaporation of the refrigerant. The heat pump system includes a compressor, a condenser, an expansion valve, and an evaporator for such processes. Representative home appliances that use such a heat pump system include a refrigerator or an air conditioner.

A main power source for refrigerant circulation in the heat pump system is a compressor, and the compressors may be largely classified into a reciprocating compressor, a rotary compressor, and a scroll compressor.

The reciprocating compressor may include a compression space that is defined between a piston and a cylinder and configured to suction or discharge a working gas. The piston is reciprocated within the cylinder to compress the refrigerant. The rotary compressor may include a compression space that is defined between a cylinder and a roller that eccentrically rotates with respect to the cylinder. A working gas is suctioned into or discharged from the compression space so that the roller eccentrically rotates along an inner wall of the cylinder to compress the refrigerant. The scroll compressor may include a compression space that is defined between an orbiting scroll and a fixed scroll and configured to suction or discharge a working gas. A refrigerant can be compressed in the compression space while the orbiting scroll rotates along the fixed scroll.

Example reciprocating compressors include a linear compressor in which a piston is directly connected to a driving motor and reciprocates linearly so that the structure of the compressor is simplified and a mechanical loss due to motion switching is reduced.

Some linear compressors include a shell that accommodates a plurality of components. Further, the linear compressors may include an oil supply assembly that is disposed within the shell for supplying oil between a cylinder and a piston.

In recent years, there has been a need of increasing an inner storage space of the refrigerator. The inner storage space of the refrigerator may increase by reducing a volume of a machine room. For example, reduction in size of the linear compressor may contribute to a smaller machine room.

The size of the linear compressor may become smaller by reducing a size of a main component of the compressor. However, this may affect performance of the compressor. To compensate the performance of the compressor, the compressor may increase its driving frequency. However, the increasing driving frequency of the compressor may increase a friction force due to oil that circulates in the compressor, thereby causing deterioration in performance of the compressor.

SUMMARY

Embodiments of the present disclosure described herein provide a linear compressor in which a gas, but oil, performs lubrication between a cylinder and a piston of the linear compressor.

Embodiment of the present disclosure described herein also provide a gas bearing type linear compressor having a structure in which an amount of gas introduced between a cylinder and a piston is adjustable.

Embodiments of the present disclosure described herein also provide a gas bearing type linear compressor having a structure that is capable of preventing foreign substances from being introduced together with a gas introduced between a cylinder and a piston.

Particular implementations of the present disclosure provide a linear compressor that includes a compressor body configured to compress a refrigerant. The compressor body may include a cylinder, a discharge valve, at least one groove, at least one gas hole, and a flow restrictor. The cylinder may receive a piston and define a moving path of the piston. The discharge valve may be configured to open and close the cylinder and may define a compression space for compressing the refrigerant with the piston. The at least one groove may be defined at an outer circumferential surface of the cylinder and may be configured to receive at least a portion of the refrigerant that is discharged from the discharge valve. The at least one gas hole may be defined at the at least one groove and may extend through the cylinder. The flow restrictor may include twisting wires and be disposed in the at least one groove. The twisting wires may include different materials from each other.

In some implementations, the linear compressor may optionally include one or more of the following features. The twisting wires of the flow restrictor may include a first wire and a second wire. The first wire may include a material configured to degrade at or above a predetermined temperature. The second wire may have heat resistance greater than the first wire. The first wire may be at least partially wound around the second wire. Each of the first wire and the second wire may include a flexible wire that is made of at least one of a natural material, a plastic, a rubber, or a metal. The first wire may include a polyethylene terephthalate (PET) material, and the second wire may include a polytetrafluoroethylene (PTFE) material. The at least one groove may be disposed circumferentially around the outer circumferential surface of the cylinder. The at least one groove may have a predetermined depth from the outer circumferential surface of the cylinder in a radial direction toward an axis of the cylinder. A width of the at least one groove may gradually decrease from the outer circumferential surface of the cylinder toward the axis of the cylinder. The at least one groove may include a first section and a second section that is radially closer to the axis of the cylinder than the first section. The first section of the at least one groove may have a first width that is consistent along a depth of the first section in the radial direction toward the axis of the cylinder. The second section of the at least one groove may have a second width that is consistent along a depth of the second section in the radial direction toward the axis of the cylinder. The second width may be smaller than the first width. The at least one groove may include a first section and a second section that interfaces with the first section and be disposed closer to the axis of the cylinder than the first section. The first section may have (i) a first depth from the outer circumferential surface of the cylinder toward the axis of the cylinder and (ii) a first width that is consistent along the first depth. The second section may have (i) a second depth from the interface toward the axis of the cylinder and (ii) a second width that is smaller than the first width and consistent along the second depth. The at least one gas hole may include a plurality of gas holes that are spaced apart from each other in a circumferential direction of the cylinder. The at least one groove may include a plurality of grooves that are spaced apart from each other in an axial direction of the cylinder. The linear compressor may include at least one diffusion groove that is defined at an inner circumferential surface of the cylinder and extends in the circumferential direction of the cylinder. The at least one diffusion groove may be disposed to correspond to a position of the at least one groove and fluidly communicate with the at least one gas hole. The at least one diffusion groove may include a plurality of diffusion grooves that are disposed to correspond to positions of the plurality of gas holes. The flow restrictor may include a fused surface layer that is on a surface of each of the first and second wires and is configured to restrict the first and second wires from being released from each other in a twisted state. The fused surface layer may include a flat surface. The linear compressor may include a shell. The compressor body may be disposed in the shell. The at least one gas groove may extend circumferentially around the circumferential surface of the cylinder. The flow restrictor may be disposed in and wound around the at least one groove.

Particular implementations of the present disclosure provide a linear compressor that includes a cylinder, a discharge valve, a groove, a gas hole, and a flow restrictor. The cylinder may receive a piston. The discharge valve may be configured to open and close the cylinder and may define a compression space for compressing a refrigerant with the piston. The groove may be defined at an outer circumferential surface of the cylinder and may be configured to receive at least a portion of the refrigerant that is discharged from the discharge valve. The gas hole may be defined at the groove and may extend through the cylinder. The flow restrictor may include twisting wires and be disposed in the groove. The twisting wires may include different materials from each other.

Some implementations of a linear compressor include: a shell which has a cylindrical shape to provide an inner space and to which a suction pipe configured to supply a refrigerant into the inner space is coupled; and a compressor body disposed in the inner space of the shell to compress the refrigerant supplied from the suction pipe, wherein the compressor body includes: a cylinder having a pipe shape to embed a piston therein, the cylinder being configured to provide a moving path of the piston; a discharge valve configured to open and close one side of the cylinder, the discharge valve being configured to define a compression space for the refrigerant together with the piston; a groove which is defined in an outer circumferential surface of the cylinder and into which at least a portion of the refrigerant discharged through the discharge valve is introduced; a gas hole defined in the groove to pass through the cylinder; and a flow restrictor manufactured by twisting wires made of different materials, the flow restrictor being disposed to be wound around the groove.

The flow restrictor may include: a first wire made of a material that is degraded when being exposed at a high temperature; and a second wire having heat resistance greater than that of the first wire.

Each of the first wire and the second wire may include a flexible wire made of one of a natural material, a plastic polymer, a rubber material, and a metal material.

The first wire may be made of a PET material, and the second wire may be made of a PTFE material.

The groove may be provided in the form of a ring in the outer circumferential surface of the cylinder along a circumferential direction of the cylinder.

The groove may be recessed by a predetermined depth from the outer circumferential surface of the cylinder in a radial direction of the cylinder.

When a width of the groove in the outer circumferential surface of the cylinder is referred to as a first width, a width of the groove may gradually decrease to a second width as the depth of the groove increases up to a first depth.

When a width of the groove in the outer circumferential surface of the cylinder is referred to as a first width, the first width may be maintained while the depth of the groove is deepened up to a second depth less than the first depth, and a second width less than the first width may be maintained while the depth of the groove is deepened from the second depth up to the first depth.

The gas hole may be provided in plurality, which are spaced apart from each other in the circumferential direction of the cylinder.

The groove may be provided in plurality, which are spaced apart from each other in an axial direction of the cylinder.

The linear compressor may further include a diffusion groove that is defined in the circumferential direction of the cylinder to correspond to a position of the groove, defined in a portion of an inner circumferential surface of the cylinder, and defined in the inner circumferential surface of the cylinder through which the gas hole passes.

The diffusion groove may be provided in plurality to correspond to positions of the gas holes.

The details of one or more embodiments are set forth in the accompanying drawings and the description below. Other features will be apparent from the description and drawings, and from the claims.

DETAILED DESCRIPTION

Embodiments of the present disclosure are described with reference to the accompanying drawings. Descriptions related to well-known functions or configurations will be omitted in order not to unnecessarily obscure the subject matter of the present disclosure. However, this does not limit the present disclosure to specific embodiments and it should be understood that the present disclosure covers all the modifications, equivalents, and replacements within the idea and technical scope of the present disclosure.

It will be understood that ordinal numbers such as first and second are used herein to describe various elements and distinguish one element from another, and that these elements should not be limited by these numbers.

It will also be understood that when an element is referred to as being "connected to" or "engaged with" another element, it can be directly connected to the other element, or intervening elements may also be present. It will also be understood that when an element is referred to as being "directly connected to" another element, there is no intervening elements.

The terms of a singular form may include plural forms unless referred to the contrary.

In this application, the terms "comprises" or "having" are intended to indicate that there may be other features, numbers, steps, operations, components, parts, or any combination thereof in addition to those described in the specification. It is to be understood that the present invention does not exclude the possibility of the presence or the addition of features, numbers, steps, operations, components, parts, or any combination thereof.

Figure 1:
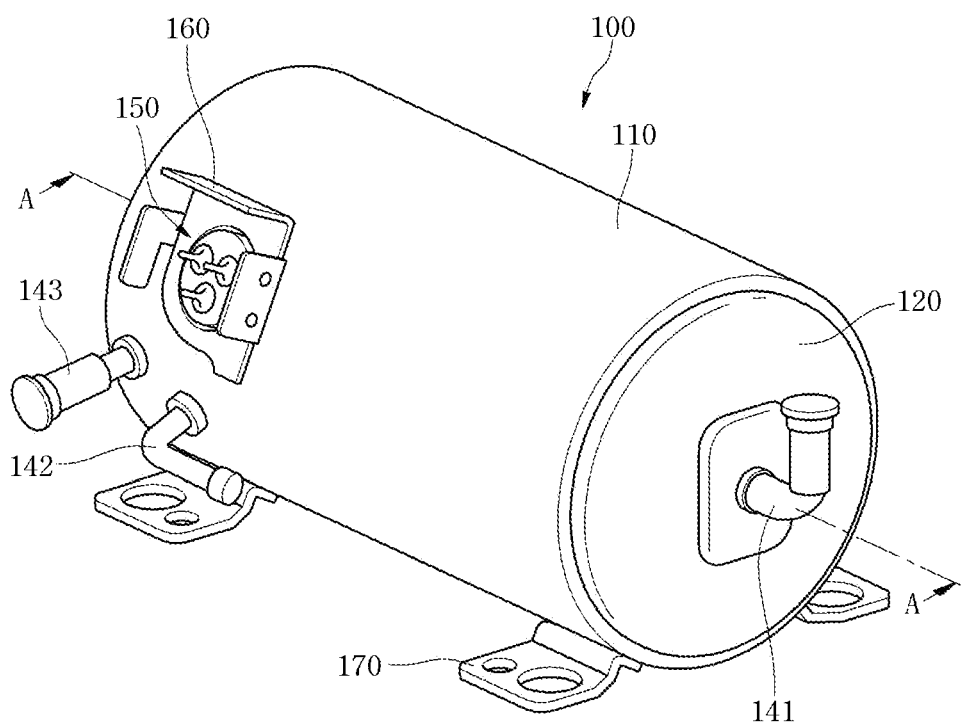
FIG. 1 is a perspective view illustrating an outer appearance of an example linear compressor.
Figure 2:
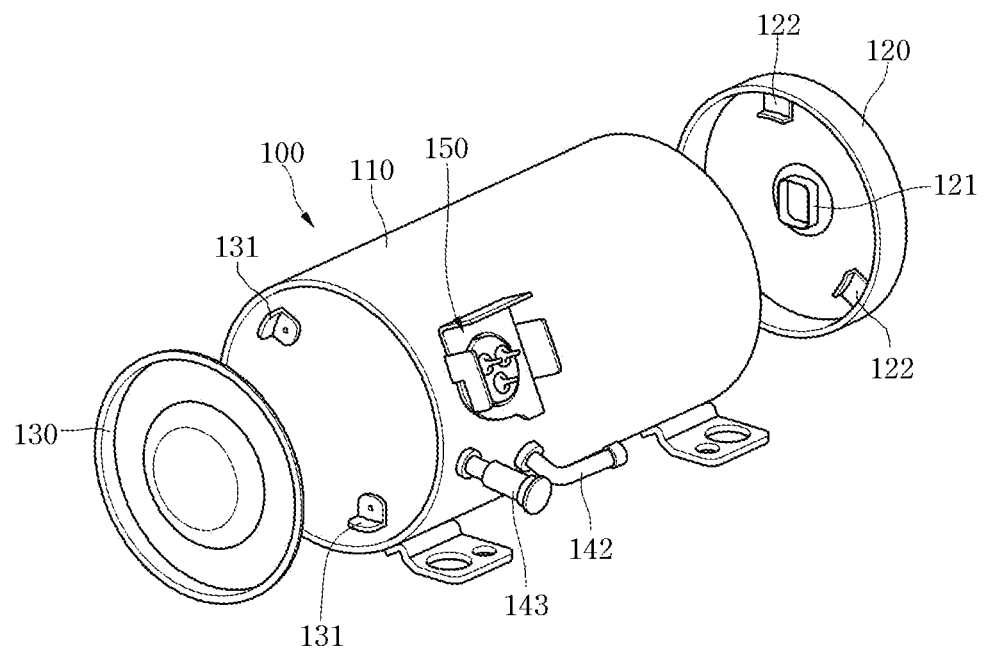
FIG. 2 is an exploded perspective view illustrating an example shall and an example shall cover of the linear compressor.

FIG. 1 is a perspective view illustrating an outer appearance of an example linear compressor, and FIG. 2 is an exploded perspective view illustrating an example shall and an example shall cover of the linear compressor.

Referring to FIGS. 1 and 2, the linear compressor 100 may include a shell 110 and shell covers 120 and 130. Although the shell covers 120 and 130 are illustrated as separate from the shell 110 in this example, each of the shell covers 120 and 130 may be understood as part of the shell 110.

A leg 170 may be coupled to a lower portion of the shell 110. The leg 170 may be coupled to a base of a product so that the linear compressor 100 is installed to the base of the product. For example, the leg 170 may be installed on a base of a machine room of a refrigerator. In another example, the leg 170 may be installed on a base of an outdoor unit of an air conditioner.

In some implementations, the shell 110 has a substantially cylindrical shape and may be disposed to be laid in a horizontal direction or to be laid in an axial direction.

In FIG. 1, the shell 110 may extend in the horizontal direction and have a relatively low height in a radial direction. Because the linear compressor 100 has the low height, a machine room (e.g., a machine room of a refrigerator) that installs the linear compressor 100 therein may be made smaller in height.

In some implementations, a terminal 150 may be disposed on an outer surface of the shell 110. The terminal 150 may transmit external power to a motor (see reference numeral 1140 of FIG. 3) of the linear compressor 100. The terminal 150 may be connected to a lead wire of a coil.

In some implementations, a bracket 160 may be disposed outside the terminal 150. The bracket 160 may serve to protect the terminal 150 against an external impact.

In some implementations, sides of the shell 110 may be open. The shell covers 120 and 130 may be coupled to the sides of the open shell 110 to seal an inner space of the shell 110.

For example, the shell covers 120 and 130 may include a first shell cover 120 that can be coupled to one side of the shell 110 and a second shell cover 130 that can be coupled to the other side of the shell 110. In FIG. 1, the first shell cover 120 may be disposed at a right portion of the linear compressor 100, and the second shell cover 130 may be disposed at a left portion of the linear compressor 100.

In some implementations, the linear compressor 100 may include a plurality of pipes 141, 142, and 143 provided in the shell 110 or the shell covers 120 and 130 to suction, discharge, or inject a refrigerant.

The plurality of pipes 141, 142, and 143 may include a suction pipe 141 through which the refrigerant is suctioned into the linear compressor 100, a discharge pipe 142 through which the compressed refrigerant is discharged from the linear compressor 100, and a process pipe 143 through which the refrigerant is supplemented to the linear compressor 100.

For example, the suction pipe 141 may be coupled to the first shell cover 120. The refrigerant may be suctioned into the linear compressor 100 through the suction pipe 141 in the axial direction.

The discharge pipe 142 may be coupled to an outer circumferential surface of the shell 110. The refrigerant that is suctioned through the suction pipe 141 may flow in the axial direction and then be compressed. The compressed refrigerant may be discharged through the discharge pipe 142.

The process pipe 143 may be coupled to the outer circumferential surface of the shell 110. A worker may inject the refrigerant into the linear compressor 100 through the process pipe 143.

The process pipe 143 may be coupled to the shell 110 at a different height from the discharge pipe 142 to avoid interference with the discharge pipe 142. Here, the height may be defined as a distance in the vertical direction (or radial direction) from the leg 170. Since the discharge pipe 142 and the process pipe 143 are coupled to the outer circumferential surface of the shell 110 at different heights, work convenience may be improved.

In some implementations, a cover support portion 121 may be disposed on an inner surface of the first shell cover 120. A first support device 1230 (see FIG. 3) may be coupled to the cover support portion 121. The cover support portion 121 and the first support device 1230, when coupled, may support a compressor body 1000 (see FIG. 3) of the linear compressor 100.

In some implementations, a stopper 122 may be provided on the inner surface of the first shell cover 120. The stopper 122 may prevent a main body of the compressor, particularly, a motor 1140 from being damaged due to collision with the shell 110 when vibration or impact occurs during transportation of the linear compressor 100.

The stopper 122 may be disposed adjacent to a rear cover 1220, which is described later in more detail. Thus, when the linear compressor 100 is shaken and causes impact, the rear cover 1220 may interfere with the stopper 122 to prevent the impact from being transmitted to the motor 1140.

In some implementations, a spring coupling portion 131 may be provided on an inner circumferential surface of the shell 110. For example, the spring coupling portion 131 may be disposed at a position that is adjacent to the second shell cover 130.

The spring coupling portion 131 may be coupled to a second support spring 1241 (see FIG. 3) of a second support device 1240 (see FIG. 3), which is described later in more detail. Since the spring coupling portion 131 and the second support device 1240 are coupled to each other, the main body of the compressor may be stably supported inside the shell 110.

Figure 3:
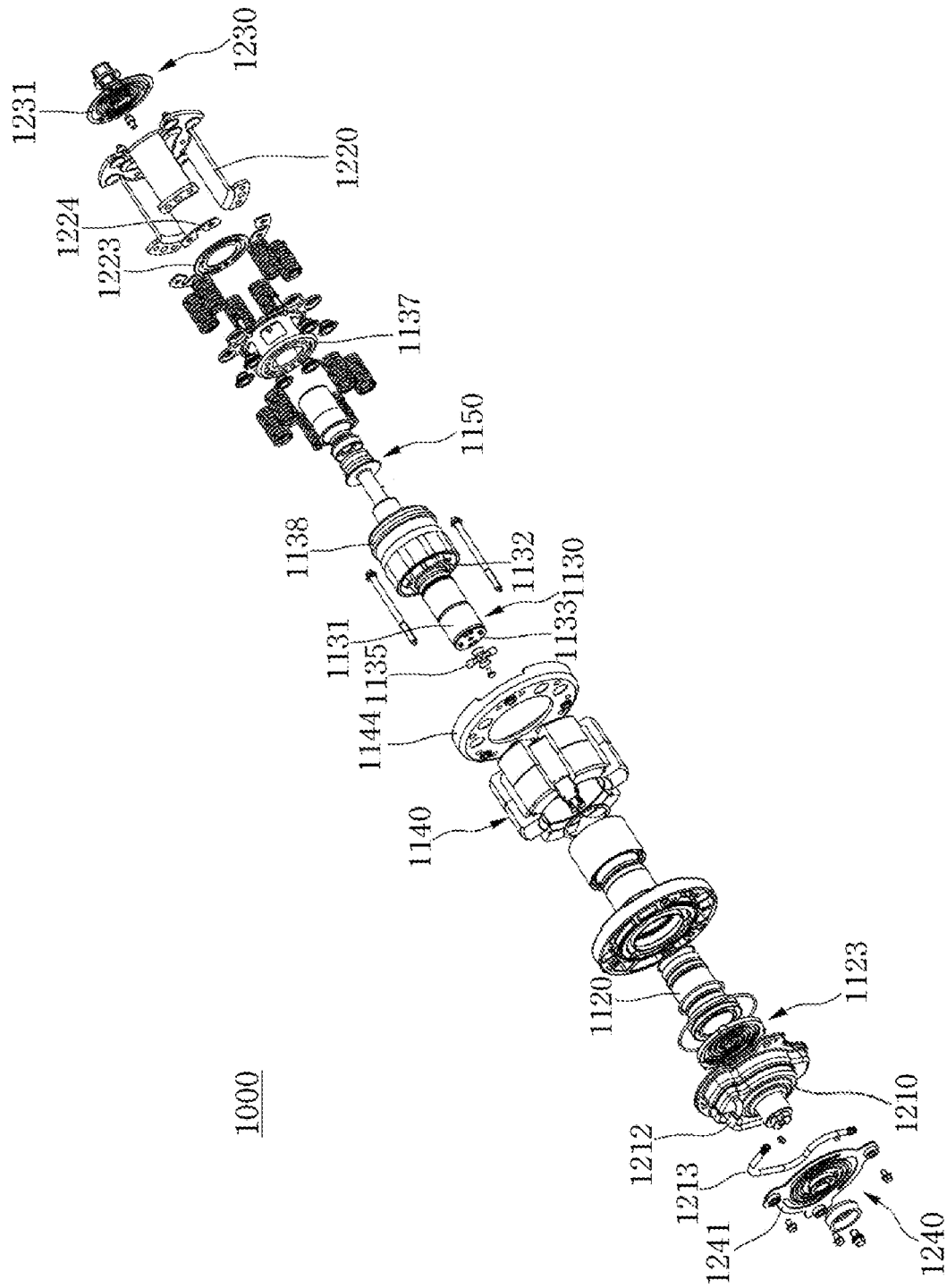
FIG. 3 is an exploded perspective view illustrating internal components of the linear compressor.
Figure 4:
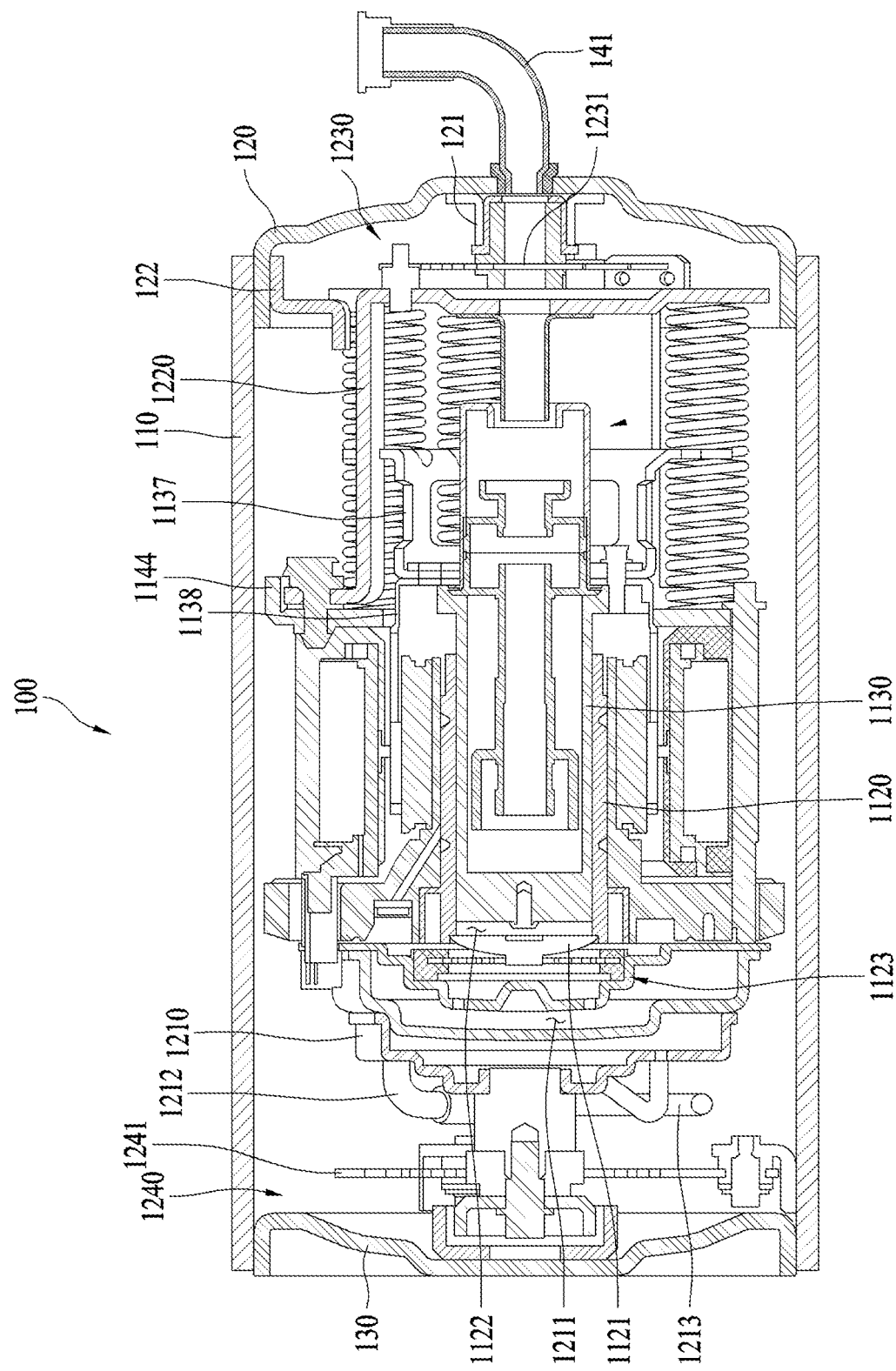
FIG. 4 is a cross-sectional view taken along line A-A of FIG. 1.

FIG. 3 is an exploded perspective view illustrating internal components of the linear compressor, and FIG. 4 is a cross-sectional view taken along line A-A of FIG. 1.

Various implementations of the linear compressor 100 may be described with respect to the following directions to help understanding. However, these directions are not absolute, and if one of the directions is changed, the rest may be changed correspondingly.

The term "axial direction" may mean a direction in which the piston 1130 reciprocates and may be understood in a left-right direction from the view of FIG. 4. In the "axial directions", a direction from the suction pipe 141 toward the compression space 1122, that is, a direction in which the refrigerant flows may be referred to as a "forward direction" (e.g., a left direction in FIG. 4), and the opposite direction may be referred to as a "backward direction" (e.g., a right direction in FIG. 4).

The "radius direction" may be understood as a direction that is perpendicular to the direction in which the piston 1130 reciprocates, i.e., the horizontal direction in FIG. 4.

The term "axis of the compressor body" may mean an axial centerline of the piston 1130. The axial centerline of the piston 1130 may pass through the first shell cover 120 and the second shell cover 130.

Referring to FIGS. 3 and 4, the linear compressor 100 may include a compressor body 1000 and one or more support devices 1230 and 1240 that support the compressor body 1000 with respect to one or more of the shell 110 and the shell covers 120 and 130.

For example, the one or more support devices 1230 and 1240 may support the compressor body 1000 so that the compressor body 1000 is maintained to be spaced apart from the shell 110.

In some implementations, the compressor body 1000 includes a cylinder 1120 provided in the shell 110, a piston 1130 that linearly reciprocates within the cylinder 1120, and a motor 1140 applying driving force to the piston 1130. When the motor 1140 is driven, the piston 1130 may reciprocate in the axial direction.

In some implementations, the piston 1130 may include a piston body 1131 having an approximately cylindrical shape and a piston flange portion 1132 extending from the piston body 1131 in the radial direction. The piston body 1131 may reciprocate within the cylinder 1120, and the piston flange portion 1132 may reciprocate outside the cylinder 1120. In some implementations, the cylinder 1120 may accommodate at least a portion of the piston body 1131. A compression space 1122 in which the refrigerant is compressed by the piston 1130 may be defined in the cylinder 1120.

A suction hole 1133 may be defined in a front portion of the piston body 1131 and configured to introduce the refrigerant into the compression space 1122. A suction valve 1135 that selectively opens the suction hole 1133 may be provided in front of the suction hole 1133.

A discharge cover 1210 may be provided in front of the compression space 1122. The discharge cover 1210 may define a discharge space 1211 for the refrigerant that is discharged from the compression space 1122. The discharge cover 1210 may include a discharge valve assembly 1121 and 1123 that may selectively discharge the compressed refrigerant to the compression space 1122.

The discharge space 1211 may include a plurality of space portions that are partitioned by an inner wall of the discharge cover 1210. The plurality of space portions are arranged in a front and rear direction to communicate with each other.

In some implementations, the compressor body 1000 may further include a cover pipe 1212 that is coupled to the discharge cover 1210 and discharges the refrigerant flowing through the discharge space 1211 of the discharge cover 1210. For example, the cover pipe 1212 may be made of a metal material.

The compressor body 1000 may further include a loop pipe 1213 that is coupled to the cover pipe 1212 and transfer the refrigerant flowing through the cover pipe 1212 to the discharge pipe 142.

The loop pipe 1213 may be coupled to the cover pipe 1212 at one end and coupled to the discharge pipe 142 at the other end.

In some implementations, the loop pipe 1213 is made of a flexible material. Also, the loop pipe 1213 may roundly extend from the cover pipe 1212 along an inner circumferential surface of the shell 110 and be coupled to the discharge pipe 142. For example, the loop pipe 1213 may be disposed in a wound shape.

The compressor body 1000 may further include a supporter 1137 for supporting the piston 1130. The supporter 1137 may be coupled to a rear side of the piston 1130.

A muffler 1150 may be disposed inside the supporter 1137 to pass through the supporter 1137. The piston flange portion 1132, a magnet frame 1138, and the supporter 1137 may be coupled to each other by using a coupling member.

In some implementations, a balance weight 1223 may be coupled to the supporter 1137. A weight of the balance weight 1223 may be determined based on a driving frequency range of the compressor body 1000.

The one or more support devices 1230 and 1240 may include a suction-side support device 1230 that may be coupled to one side of the compressor body 100. The suction-side support device 1230 may be disposed at a portion of the compressor body 1000, through which the refrigerant is suctioned.

The one or more support devices 1230 and 1240 may include a discharge-side support device 1240 that may be coupled to the other side of the compressor body 1000. The discharge-side support device 1240 may be disposed at a portion of the compressor body 1000, through which the refrigerant is discharged.

The suction-side support device 1230 and the discharge-side support device 1240 can absorb axial and radial vibrations of the compressor body 1000 and prevent the compressor body 1000 from directly colliding with the shell 110 or the shell covers 120 and 130.

Figure 5:
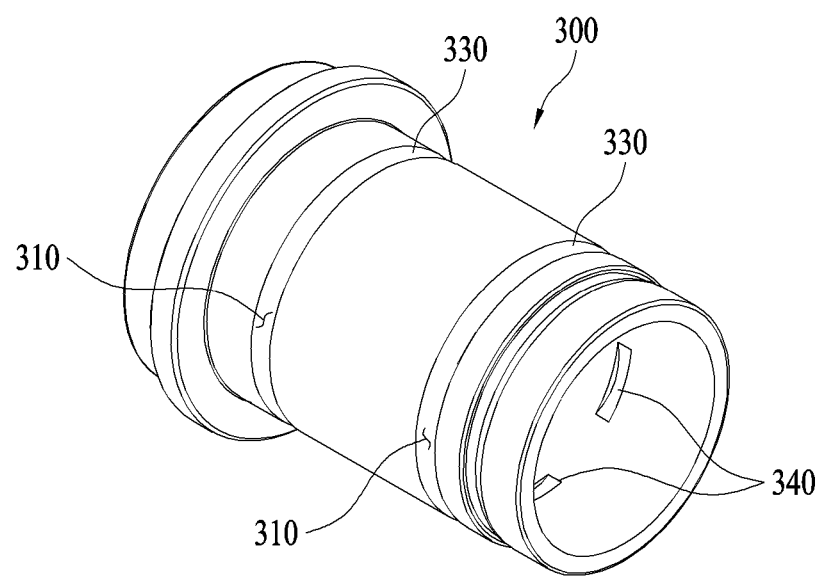
FIG. 5 is a perspective view of an example cylinder.
Figure 6:
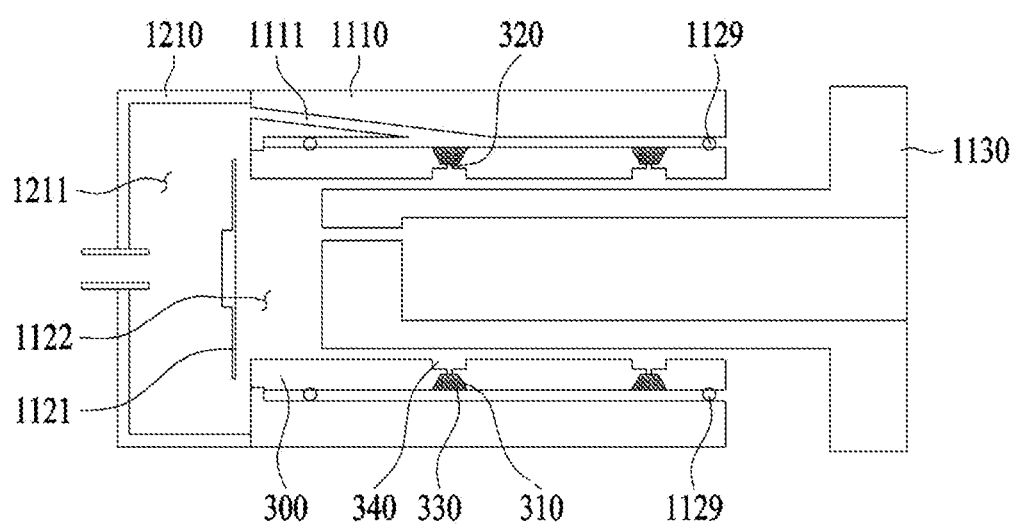
FIG. 6 is a cross-sectional view illustrating example peripheral components around the cylinder.

FIG. 5 is a perspective view illustrating an outer appearance of the cylinder 300 of the linear compressor 100, and FIG. 6 is a cross-sectional view for explaining a flow path of the refrigerant in addition to peripheral components around the cylinder 300 of the linear compressor 100 (see FIG. 4).

Referring to FIGS. 5 to 6, the linear compressor 100 may include a frame 1110, the cylinder 300, the discharge valve 1121, and the discharge cover 1210.

In some implementations, the frame 1110 may be configured to fix the cylinder 300. For example, the cylinder 300 may be press-fitted into the frame 1110 so as to be coupled to the frame 1110.

The cylinder 300 and the frame 1110 may be press-fitted to be coupled to each other in such a way that, rather than the entire outer circumferential surface of the cylinder 300 is press-fitted to be coupled to each other, one end of the cylinder 300 may be press-fitted into one end of the frame 1110 so as to be coupled to each other. For example, a left end of the cylinder 300 may be press-fitted into the frame 1110 with respect to the view of FIG. 6.

A predetermined gap may be defined between the cylinder 300 and the frame 1110, and a portion of the refrigerant may be supplied to the gap.

A refrigerant bypass pipe 1111 may be provided in the frame 1110 and configured to supply the refrigerant in the discharge space 1211 to the gap defined between the frame 1110 and the cylinder 300.

The gap formed between the frame 1110 and the cylinder 300 may be sealed by a sealing member 1129 disposed on the other end of each of the frame 1110 and the cylinder 300. The sealing member 1129 may be made of a material having elasticity. For example, the sealing member 1129 may be provided in the form of a rubber ring.

In some implementations, the discharge valve 1121 may close or open one side of the cylinder 300 and may define the compression space 1122 in the cylinder 300 together with the piston 1130.

In some implementations, the discharge cover 1210 may be coupled to a front surface of the frame 1110 by various fastening members. The discharge cover 1210 coupled to the front surface of the frame 1110 may define the discharge space 1211.

The refrigerant that is discharged from the discharge valve 1121 may be introduced into the discharge space 1211. A portion of the refrigerant discharged to the discharge space 1211 may recirculate through the cover pipe 1212 (see FIG. 4), and the remaining portion of the refrigerant may be supplied to a space between the cylinder 300 and the piston 1130 through the refrigerant bypass pipe 1111.

In some implementations, the cylinder 300 may include a groove 310, a gas hole 320, and a flow restrictor 330. The cylinder 300 in these implementations may share its characteristics with the cylinder 300 that is illustrated in FIGS. 3 to 4.

The cylinder 300 may provide a reciprocating path of the piston 1130 by embedding the piston 1130 as a pipe shape. In addition, as described above, the cylinder 300 may provide the compression space 1122 for the refrigerant together with the discharge valve 1121 and the piston 1130.

In some implementations, the groove 310 may be defined in a ring shape along a circumferential direction of the cylinder 300 on an outer circumferential surface of the cylinder 300.

The groove 310 may be defined as a portion recessed from the outer circumferential surface of the cylinder 300 toward the inner circumferential surface of the cylinder 300. For example, the groove 310 may have a groove shape that may be defined as a portion recessed by a predetermined depth in the radial direction from the outer circumferential surface of the cylinder 300.

The groove 310 may communicate with the gap between the frame 1110 and the cylinder 300. Accordingly, the refrigerant that is supplied through the refrigerant bypass pipe 1111 may be introduced into the groove 310 through the gap.

The groove 310 may be provided in a plurality, which are spaced apart from each other in the axial direction of the cylinder 300. The plurality of grooves 310 may be spaced at a predetermined distance from each other in the axial direction of the cylinder 300.

In some implementations, the gas hole 320 may be defined to communicate with the groove 310. For example, the gas hole 320 may be defined to pass through the cylinder 300 from the groove 310.

The plurality of gas holes 320 may be defined in the groove 310 along the circumferential direction of the cylinder 300. For example, at least four gas holes 320 may be defined at equal intervals.

The gas hole 320 may serve as a passage through which the refrigerant introduced into the groove 310 is supplied to the inside of the cylinder 300.

In some implementations, the flow restrictor 330 may further include a diffusion groove 340. In some implementations, the diffusion groove 340 may be defined on the inner circumferential surface of the cylinder 300. The diffusion groove 340 may be defined as a portion recessed from the inner circumferential surface of the cylinder 300 toward the outer circumferential surface of the cylinder 300.

The diffusion groove 340 may be defined to correspond to the position of the groove 310. For example, the diffusion groove 340 may be continuously defined in a ring shape at the inner circumferential surface of the cylinder 300, similarly to the groove 310.

In another example, the diffusion groove 340 may be defined to correspond to the position of the groove 310, but may be discontinuously defined. For example, the diffusion groove 340 may be partially defined around the gas hole 320.

The diffusion groove 340 may provide a space through which the refrigerant that is supplied to the space between the cylinder 300 and the piston 1130 is smoothly diffused through the groove 310 and the gas hole 320. As a result, the refrigerant that is supplied between the cylinder 300 and the piston 1130 may serve as a bearing.

In some implementations, the flow restrictor 330 may be disposed in a shape that is wound around the groove 310 of the cylinder 300.

The flow restrictor 330 may be a flexible wire. The flow restrictor 330 may be disposed to be wound at least once on the groove 310 of the cylinder 300 and may be disposed to cover at least a portion of the gas hole 320.

When a size of the gas hole 320 is large, the gas hole 320 can be processed easily, thereby facilitating production and increasing an inflow amount of refrigerant. On the other hand, as the size of the gas hole 320 increases, an amount of refrigerant that is discharged between the cylinder 300 and the piston 1130 may increase and cause deterioration of the compression efficiency of the refrigerant. In addition, foreign substances may be easily introduced into the cylinder 300 to cause damage of the cylinder 300 or the piston 1130.

In some implementations, the gas hole 320 may have a large size to reduce the processing difficulty, thereby improving the production, and at the same time, the flow restrictor effectively reduces the size of the gas hole 320 to adjust an inflow amount of refrigerant and prevent foreign substances from being introduced through the gas hole 320.

In some implementations, the gas hole 320 may have a diameter of, for example, about 0.1 mm to about 0.2 mm.

An example process for supplying a refrigerant as the bearing will be sequentially described with reference to FIG. 6. The refrigerant may be supplied to the compression space 1122 through the suction pipe 141 (see FIG. 4), the suction muffler 1150 (see FIG. 4) and the piston 1130.

The refrigerant that is introduced into the compression space 1122 may be compressed by the reciprocating motion of the piston 1130. When the refrigerant introduced into the compression space 1122 is compressed to a predetermined pressure or more, the refrigerant may be discharged by the discharge valve 1121.

The discharge valve 1121 may receive elastic force through a spring assembly 1123 (see FIG. 4) disposed between the discharge cover 1210 and the discharge valve 1121 and open or close one side of the cylinder 300 based on the received elastic force.

The refrigerant in the compression space 1122 may be compressed as the piston 1130 reciprocates linearly inside the cylinder 300. When a pressure within the compression space 1122 gradually increases, force that pushes the discharge valve 1121 may increase.

When the pressure of the refrigerant is greater than the elastic force of the valve spring 301, the discharge valve 1121 may be pushed axially to open one side of the cylinder 300, and the refrigerant may be discharged from the cylinder 300.

When the refrigerant is discharged, and thus, the pressure of the compression space 1122 is lowered, the discharge valve 1121 may again close the one side of the cylinder 300 by the elastic force of the valve spring 301.

The refrigerant discharged through the discharge valve 1121 may be introduced into the discharge space 1211. A portion of the introduced refrigerant may recirculate through the cover pipe 1212 (see FIG. 4), and the remaining portion of the refrigerant may be supplied to the space between the cylinder 300 and the piston 1130 through the refrigerant bypass pipe 1111.

The refrigerant supplied through the refrigerant bypass pipe 1111 may be supplied between the cylinder 300 and the piston 1130 through the groove 310 and the gas hole 320.

Figure 7:
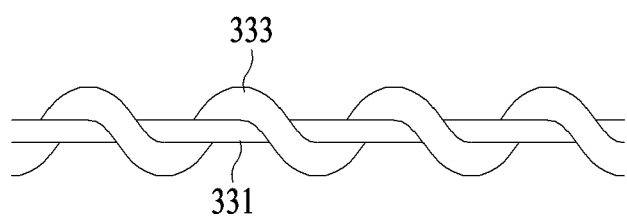
FIG. 7 is a schematic view of an example flow restrictor.

FIG. 7 is a schematic view of an example flow restrictor 330.

In some implementations, the flow restrictor 330 may be made of at least one flexible wire. For example, multiple wires that are made of different materials may be combined. For example, the flow restrictor 330 may be made of at least one of natural materials (e.g., cotton, hemp, silk, and other suitable natural materials), plastic polymers (e.g., PET, PTFE, Nylon, and other suitable plastic polymers), rubber, or metal materials.

In some implementations, the flow restrictor 330 may be manufactured by combining at least two or more wires. For example, the flow restrictor 330 may include a first wire 331 made of a material that loses tension and degrades when exposed to a high temperature, and a second wire 333 having more heat resistant than the first wire 331.

The flow restrictor 330 may be manufactured by the first wire 331 and the second wire 333, which are twisted with each other. For example, in FIG. 7, the flow restrictor 330 may be manufactured by twisting the second wire 333 around the first wire 331.

Here, the flow restrictor 330 may be manufactured by winding around the groove 310 the first wire 331 and the second wire 333 that are twisted with each other.

If only the first wire 331 is wound around the groove 310, the first wire 331 may degrade by heat generated during operation of the linear compressor 100 and thus may not be able to perform the role of the flow restrictor 330. If only the second wire 333 is wound around the groove 310, the second wire 333 may be densely disposed to excessively close the gas hole 320.

When the first wire 331 and the second wire 333 are combined and used together, the features of the first and second wires 331 and 333 may be combined with each other so as to be utilized for the intended purposes discussed herein. For example, during operation of the linear compressor 100, the first wire 331 may degrade by the generated heat, which causes loss of the tension and thus generates a gap, thereby securing a space through which the refrigerant is introduced into the gas hole 320.

In some implementations, the flow restrictor 330 may utilize wires made of various materials according to the use environment. For example, the first wire 331 may be made of a polyethylene terephthalate (PET) material, and the second wire 333 may be made of a polytetrafluoroethylene (PTFE) material.

The second wire 333 made of the PTFE material may be strong in heat resistance and thus be maintained in tension even during the operation of the linear compressor 100. The first wire 331 made of the PET material may degrade by the heat generated during the operation process of the linear compressor 100. Thus, the tension may be reduced, and a refrigerant inflow space may be secured between the wires 331 and 333.

In some implementations, the first wire 331 may be made of, for example, 150 denier (g/9000 m), and the second wire 333 may be made of 200 denier (g/9000 m).

For example, the flow restrictor 330 may be manufactured so that the first wire 331 and the second wire 333 have the twist number of 90 turn/m.

The flow restrictor 330 may have a fused surface layer. For example, the fused surface layer may be disposed on surfaces of the first wire 331 and the second wire 333, which are in the twisted state.

The fused surface layer may be disposed closer to the outer circumferential surface than the inner circumferential surface of the cylinder 310. For example, the fused surface layer may be disposed outside in the radial direction of the cylinder 310 when the first wire 331 and the second wire 333 are twisted and wound around the groove 310.

The fused surface layer may be fused using an ironing machine when the first wire 331 and the second wire 333 are twisted. Thus, at least a portion of the first wire 331 and at least a portion of the second wire 333 may be fused.

The fused surface layer may be flat. For example, the surfaces of the first wire 331 and the second wire 333 may be flattened by the fused surface layer. The fused surface layer may prevent release (e.g., unwinding) of the winding of the first wire 331 and the second wire 333 after being wound around the groove 310.

Figure 8:
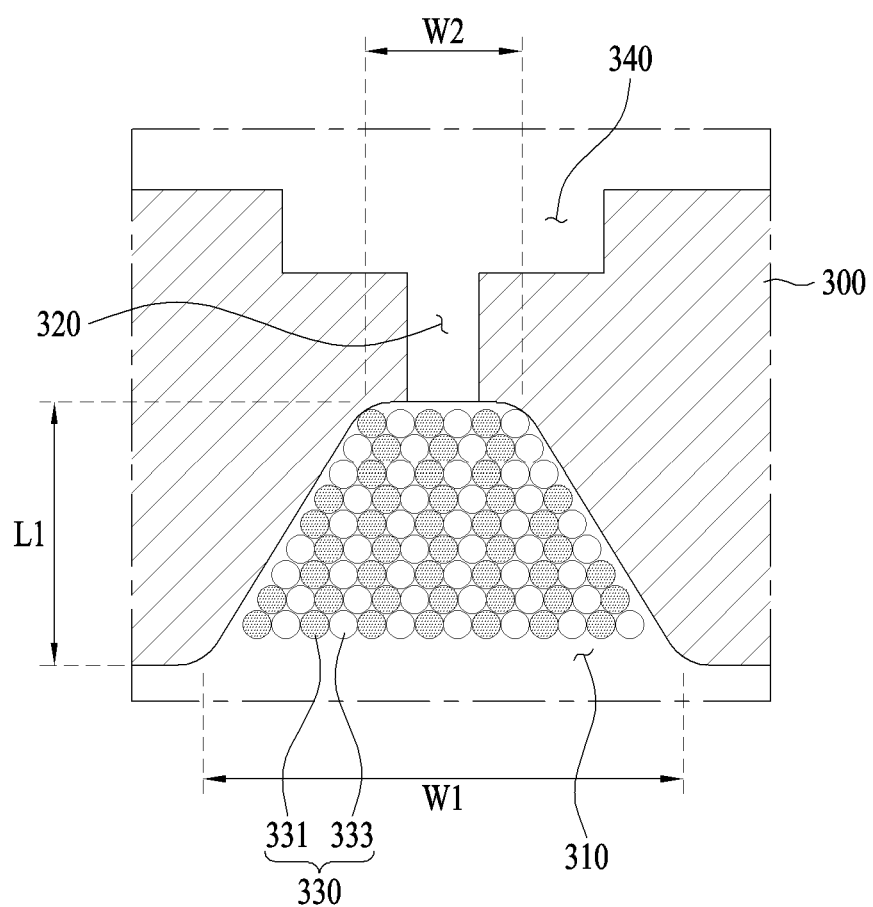
FIG. 8 is an enlarged cross-sectional view illustrating an example groove and an example diffusion groove of the cylinder.

FIG. 8 is an enlarged cross-sectional view illustrating the groove 310 and the diffusion groove 340 of the cylinder 300. In some implementations, the groove 310 may be defined so that a width thereof gradually decreases as a depth thereof increases.

For example, where the width of the groove 310 in the outer circumferential surface of the cylinder 300 is referred to as a first width W1, the width of the groove 310 may continuously decrease from the first width W1 to a second width W2 as the depth of the groove 310 increases toward a first depth L1. The groove 310 may have a trapezoidal shape in the view FIG. 8. Since the groove 310 has the trapezoidal shape, the flow restrictor 330 may be naturally collected to a bottom of the groove 310 while the flow restrictor is wound.

The width (axial width) of the gas hole 320 may be defined to be less than that of the groove 310. For example, the width of the gas hole 320 may be less than the second width W2 of the groove.

The width (axial width) of the diffusion groove 340 may be defined to be greater than that of the gas hole 320. In addition or alternatively, the width of the diffusion groove 340 may be defined to be less than the first width W1 of the groove 310 and greater than the second width W2 of the groove 310.

Figure 9:
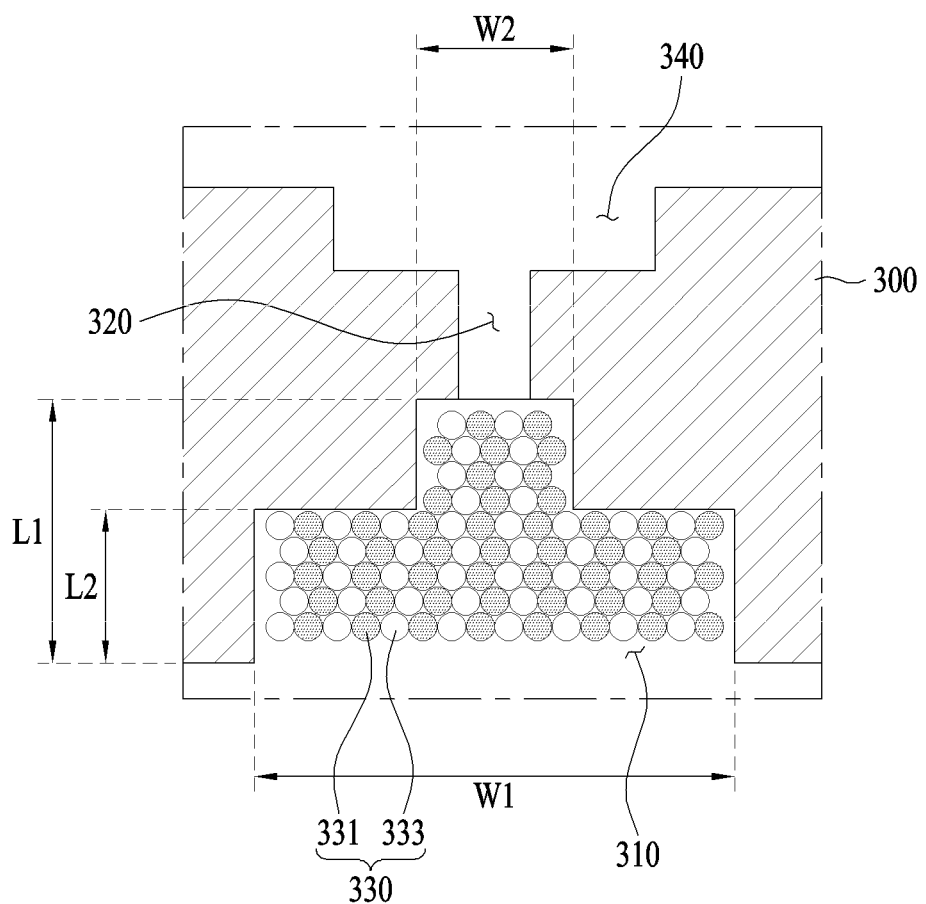
FIG. 9 is an enlarged cross-sectional view illustrating another example groove and another example diffusion groove of the cylinder.

FIG. 9 is an enlarged cross-sectional view illustrating another example groove and another example diffusion groove of the cylinder. The groove 310 in this example may have a width that decreases in a stepped manner as a depth of the groove increases.

The groove 310 may be recessed to have a first depth L1 from an outer circumferential surface of a cylinder 300. Here, the groove 310 may be defined to decrease in width in a stepped manner as the depth increases toward the first depth L1.

For example, where the width of the groove 310 in the outer circumferential surface of the cylinder 300 is referred to as a first width W1, the first width W1 may be maintained as the depth of the groove 310 increases to a second depth L2.

As the depth of the groove 310 increases from the second depth L2 to the first depth L1, a second width W2 that is less than the first width W1 may be maintained. The groove 310 may have a stair shape in the view of FIG. 9. Thus, the flow restrictor 330 may be more intensively disposed at a position of the gas hole 320.

A width of the gas hole 320 may be less than that of the groove 310. For example, the width of the gas hole 320 may be less than the second width W2 of the groove.

A width of a diffusion groove 340 may be defined to be greater than that of the gas hole 320. In addition or alternatively, the width of the diffusion groove 340 may be defined to be less than the first width W1 of the groove 310 and greater than the second width W2 of the groove 310.

It is apparent to those skilled in the art that the present disclosure may be embodied in other specific forms without departing from the spirit and essential features of the present disclosure. The detailed description is intended to be illustrative, but not limiting in all aspects.

According to the various embodiments, the portion of the refrigerant may perform the lubrication between the cylinder and the piston of the linear compressor.

According to the various embodiments, the amount of gas introduced between the cylinder and the piston may be adjusted.

According to the various embodiments, the foreign substances that may be introduced between the cylinder and the piston together with the refrigerant may be blocked.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A linear compressor comprising: a compressor body configured to compress a refrigerant, the compressor body comprising: a cylinder that receives a piston and that defines a moving path of the piston; a discharge valve that is configured to open and close the cylinder and that defines a compression space for compressing the refrigerant with the piston; at least one groove that is defined at an outer circumferential surface of the cylinder and that is configured to receive at least a portion of the refrigerant that is discharged from the discharge valve; at least one gas hole that is defined at the at least one groove and that extends through the cylinder; and a flow restrictor that includes twisting wires and is disposed in the at least one groove, wherein the twisting wires include different materials from each other, wherein the twisting wires of the flow restrictor comprise: a first wire that includes a material configured to degrade at or above a predetermined temperature; and a second wire having heat resistance greater than the first wire, and wherein the flow restrictor further comprises a fused surface layer that is on a surface of each of the first and second wires and is configured to restrict the first and second wires from being released from each other in a twisted state.

2. The linear compressor according to claim 1, wherein the first wire includes a polyethylene terephthalate (PET) material, and the second wire includes a polytetrafluoroethylene (PTFE) material.

3. The linear compressor according to claim 1, wherein the first wire is at least partially wound around the second wire.

4. The linear compressor according to claim 1, wherein the at least one groove is disposed circumferentially around the outer circumferential surface of the cylinder.

5. The linear compressor according to claim 4, wherein the at least one groove has a predetermined depth from the outer circumferential surface of the cylinder in a radial direction toward an axis of the cylinder.

6. The linear compressor according to claim 5, wherein a width of the at least one groove gradually decreases from the outer circumferential surface of the cylinder toward the axis of the cylinder.

7. The linear compressor according to claim 5, wherein the at least one groove includes a first section and a second section that is radially closer to the axis of the cylinder than the first section,
wherein the first section of the at least one groove has a first width that is consistent along a depth of the first section in the radial direction toward the axis of the cylinder, and
wherein the second section of the at least one groove has a second width that is consistent along a depth of the second section in the radial direction toward the axis of the cylinder, the second width being smaller than the first width.

8. The linear compressor according to claim 5, wherein the at least one groove includes a first section and a second section that interfaces with the first section and is disposed closer to the axis of the cylinder than the first section,
wherein the first section has (i) a first depth from the outer circumferential surface of the cylinder toward the axis of the cylinder and (ii) a first width that is consistent along the first depth,
wherein the second section has (i) a second depth from an interface where the first section and the second section interface with each other toward the axis of the cylinder and (ii) a second width that is smaller than the first width and consistent along the second depth.

9. The linear compressor according to claim 6, wherein the at least one gas hole includes a plurality of gas holes that are spaced apart from each other in a circumferential direction of the cylinder.

10. The linear compressor according to claim 9, wherein the at least one groove includes a plurality of grooves that are spaced apart from each other in an axial direction of the cylinder.

11. The linear compressor according to claim 10, further comprising at least one diffusion groove that is defined at an inner circumferential surface of the cylinder and extends in the circumferential direction of the cylinder, the at least one diffusion groove disposed to correspond to a position of the at least one groove and fluidly communicate with the at least one gas hole.

12. The linear compressor according to claim 11, wherein the at least one diffusion groove includes a plurality of diffusion grooves that are disposed to correspond to positions of the plurality of gas holes.

13. The linear compressor according to claim 1, wherein the fused surface layer includes a flat surface.

14. The linear compressor according to claim 1, further comprising:
a shell, wherein the compressor body is disposed in the shell.

15. The linear compressor according to claim 1, wherein the at least one groove extends circumferentially around the circumferential surface of the cylinder.

16. The linear compressor according to claim 15, wherein the flow restrictor is disposed in and wound around the at least one groove.

17. A linear compressor comprising:
a cylinder that receives a piston;
a discharge valve that is configured to open and close the cylinder and that defines a compression space for compressing a refrigerant with the piston;
a groove that is defined at an outer circumferential surface of the cylinder and that is configured to receive at least a portion of the refrigerant that is discharged from the discharge valve;
a gas hole that is defined at the groove and that extends through the cylinder; and
a flow restrictor that includes twisting wires and that is disposed in the groove, wherein the twisting wires include different materials from each other,
wherein the twisting wires of the flow restrictor comprise:
a first wire that includes a material configured to degrade at or above a predetermined temperature, and
a second wire having heat resistance greater than the first wire, and
wherein the flow restrictor further comprises a fused surface layer that is on a surface of each of the first and second wires and is configured to restrict the first and second wires from being released from each other in a twisted state.

18. The linear compressor according to claim 17, wherein the first wire is at least partially wound around the second wire.

19. The linear compressor according to claim 17, wherein the first wire includes a polyethylene terephthalate (PET) material, and the second wire includes a polytetrafluoroethylene (PTFE) material.

20. The linear compressor according to claim 17, wherein the fused surface layer includes a flat surface.

* * * * *